(12) United States Patent
Welch et al.

(10) Patent No.: US 6,168,186 B1
(45) Date of Patent: Jan. 2, 2001

(54) HEAD AIR BAG SYSTEM

(75) Inventors: Jeffrey Allen Welch, Washington, MI (US); Douglas Stephen Weston, Tipp City; Nicole M. Mahmood, New Carlisle, both of OH (US); Bassam Georges Khoudari, Sterling Heights, MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/321,289

(22) Filed: May 27, 1999

(51) Int. Cl.$^7$ .................................................. B60R 21/16
(52) U.S. Cl. ...................................... 280/728.2; 280/730.2
(58) Field of Search ............................... 280/730.2, 728.2, 280/740, 742

(56) References Cited

U.S. PATENT DOCUMENTS

| | | | |
|---|---|---|---|
| 5,678,852 | * 10/1997 | Brown et al. | 280/730.2 |
| 5,704,637 | * 1/1998 | Matsuura et al. | 280/730.2 |
| 5,791,683 | * 8/1998 | Shibata et al. | 280/730.2 |

* cited by examiner

Primary Examiner—Kenneth R. Rice
(74) Attorney, Agent, or Firm—Kathryn A. Marra

(57) ABSTRACT

A head air bag system for an automotive vehicle includes a bracket mounted to a C-pillar of an automotive vehicle, an inflator mounted to the bracket, and an air bag operatively connected to the inflator. The air bag system also includes a trim molding housing the inflator, bracket and the air bag. The air bag is inflated by the inflator adjacent a head of a rear occupant seated in the automotive vehicle.

20 Claims, 2 Drawing Sheets

HEAD AIR BAG SYSTEM

TECHNICAL FIELD

The present invention relates generally to inflatable restraint systems for vehicles and, more particularly, to a head air bag system for an automotive vehicle.

BACKGROUND OF THE INVENTION

It is known to provide an inflatable restraint system in a vehicle such as an automotive vehicle to augment protection traditionally afforded vehicle occupants through the use of seat belts. In some automotive vehicles, the inflatable restraint system may be an air bag system disposed within an occupant compartment in the automotive vehicle in close proximity to either a driver occupant or one or more passenger occupants. Typically, the air bag system includes an air bag module attached to vehicle structure and having an air bag for deployment through an opening in a cover to extend in an occupant compartment of the automotive vehicle. The deployed air bag restrains movement of the occupant to help protect the occupant from forcefully striking parts of the automotive vehicle as a result of a collision. In the case of head air bags, the air bag module can be mounted in the roof rail.

Although the above head air bag system has worked well, it is desirable to provide a head protection for a rear occupant in an automotive vehicle. It is also desirable to provide a head air bag system for a rear occupant in an automotive vehicle that deploys quickly for immediate impacts, but also provides extended inflation for rollovers and other longer duration events, there is a need in the art to provide an improved head air bag system.

SUMMARY OF THE INVENTION

It is, therefore, one object of the present invention to provide a head air bag system for a C-pillar in an automotive vehicle.

It is another object of the present invention to provide a head air bag system for a C-pillar with a trim molding and bracket which acts as a head absorption for occupants.

To achieve the foregoing objects, the present invention is a head air bag system for an automotive vehicle including a bracket mounted to a C-pillar of the automotive vehicle and an inflator mounted to the bracket. The head air bag system also includes an air bag operatively connected to the inflator. The head air bag system further includes a trim molding housing the inflator, bracket and the air bag. The air bag, inflated by the inflator, is extended adjacent a head of a rear occupant seated in the automotive vehicle.

One advantage of the present invention is that an improved head air bag system is provided for an automotive vehicle. Another advantage of the present invention is that the head air bag system provides an air bag for the head of a rear occupant in the automotive vehicle. Yet another advantage of the present invention is that the head air bag system is mounted to a C-pillar of the automotive vehicle. Still another advantage of the present invention is that the head air bag system provides better performance for rear occupants of an automotive vehicle. A further advantage of the present invention is that the head air bag system provides additional head protection during side impact conditions. Still a further advantage of the present invention is that the head air bag system provides head protection for rear occupants using C-pillar trim molding.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 3 is a perspective view of a portion of the head air bag system of FIG. 1.

DESCRIPTION OF THE PREFERRED EMBODIMENT

Figure 1:
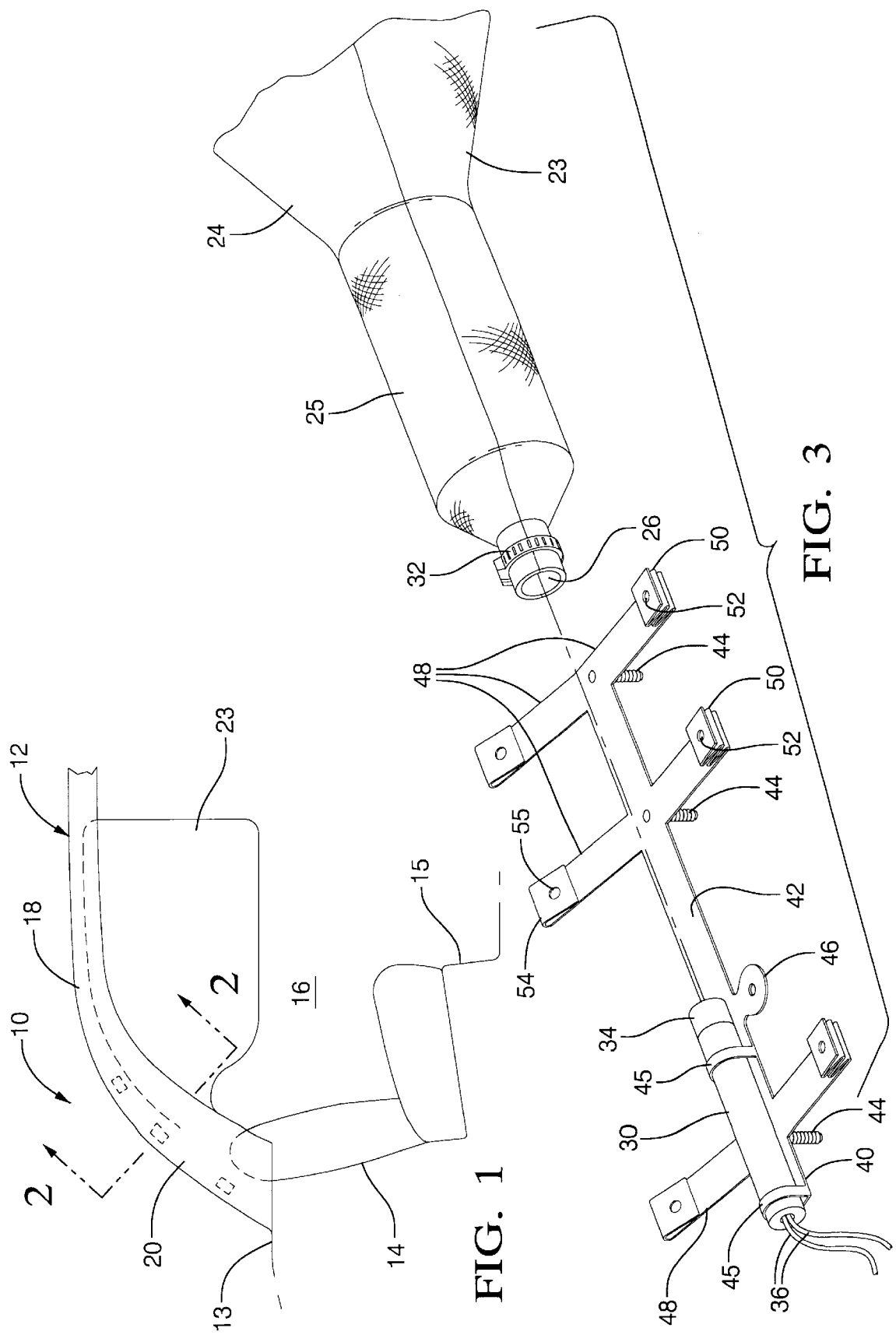
FIG. 1 is a front elevational view of a head air bag system, according to the present invention, illustrated in operational relationship with an automotive vehicle.
Figure 2:
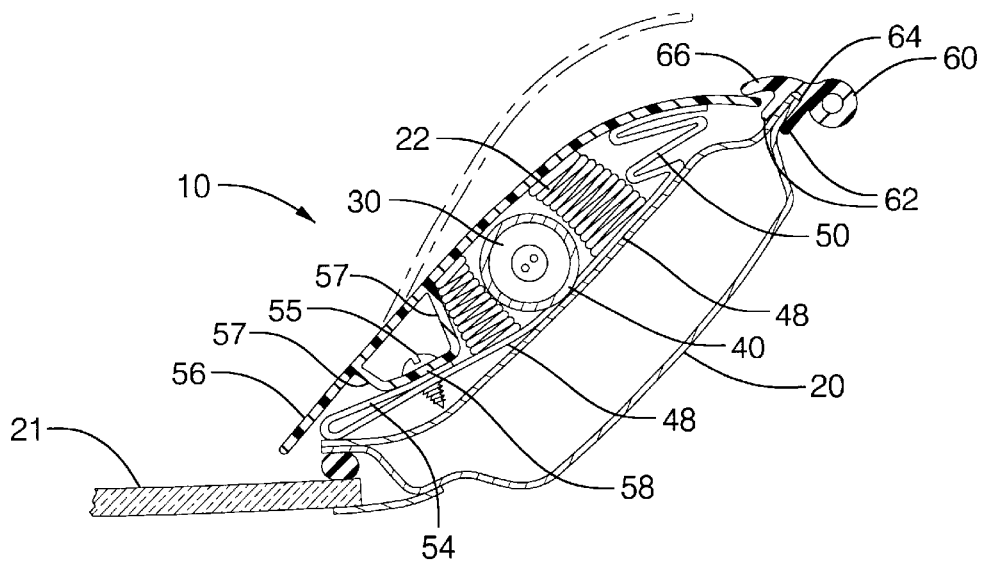
FIG. 2 is a sectional view taken along line 2—2 of FIG. 1.

Referring to the drawings and in particular FIGS. 1 and 2, one embodiment of a head air bag system 10, according to the present invention, is shown for a vehicle (partially shown) such as an automotive vehicle, generally indicated at 12. The automotive vehicle 12 includes a vehicle body 13 and a seat 14 mounted by suitable means to vehicle structure 15 in an occupant compartment 16 of the vehicle body 13. In this embodiment, the seat 14 is a rear seat of the automotive vehicle 12. The automotive vehicle 12 includes a roof rail 18 extending longitudinally along each side thereof. The automotive vehicle 12 includes a C-pillar 20 connected to each roof rail 18 and the vehicle body 13. The automotive vehicle 12 includes a rear window 21 extending laterally between the C-pillars 20. The rear window 21 is a pane of glass as is known in the art. The automotive vehicle 12 also includes a vehicle side or door (not shown) disposed adjacent the seat 14 and connected to the vehicle body 13. An occupant (not shown) is typically seated in the seat 14 adjacent the side or door. It should be appreciated that, except for the head air bag system 10, the automotive vehicle 10 is conventional and known in the art.

Referring to FIGS. 1 through 3, the head air bag system 10, according to the present invention, includes an air bag, generally indicated at 22, for deployment and inflation between the vehicle side and the occupant. The air bag 22 is of a curtain type and includes an inboard or first panel 23 and an outboard or second panel 24. The inboard panel 23 and outboard panel 24 are generally rectangular in shape. As illustrated in FIG. 3, the air bag 22 also includes a neck or connecting portion 25 connected to the inboard panel 23 and outboard panel 24. The connecting portion 25 is generally cylindrical in shape when it is inflated. The connecting portion 25 also includes an inflator aperture 26 centrally located therein for a function to be described. The inboard panel 23, outboard panel 24 and connecting portion 25 are connected or attached together by stitching with a thread material along the perimeter thereof. The inboard panel 23, outboard panel 24 and connecting portion 25 are made of a fabric material such as nylon or polyester as is known in the art.

The head air bag system 10 includes an inflator 30 operatively connected to the air bag 22 for inflating the air bag 22. The inflator 30 is generally cylindrical in shape and extends axially through the inflator aperture 26 to be at least partially disposed within the air bag 22. The inflator 30 is of a cylindrical hybrid type that is conventional and known in the art. The connecting portion 25 of the air bag 22 is secured to the inflator 30 by a clamp 32 such as a hose clamp, which is conventional and known in the art. The inflator 30 may include a radial to axial flow adapter 34 at an axial end thereof. The adapter 34 is generally cylindrical in shape and has a plurality of apertures (not shown) to allow the gas to pass therethrough. The inflator 30 is connected by wires 36 to a source of power (not shown) for activating the inflator 30. It should be appreciated that the inflator 30 is activated by the source of power to expel a gas.

The head air bag system 10 includes an inflator bracket 40 mounted to the C-pillar 20. The inflator bracket 40 has a central portion 42 extending axially and being generally rectangular in shape. The inflator bracket 40 also has a plurality of mounting studs 44 spaced axially along the central portion 42. The mounting studs 44 may be of a Christmas-tree type which are extended through apertures (not shown) in an inboard panel 45 of the C-pillar 20 and secured in place. The inflator bracket 42 includes a pair of stand-offs or straps 45 spaced axially and overlapping the inflator 30 to secure the inflator 30 to the inflator bracket 42. The inflator bracket 42 may include a tension strap attachment 46 extending radially for attachment to a tension strap (not shown). The inflator bracket 42 includes a plurality of attachment arms 48 extending outwardly radially from the central portion 42. Preferably, the attachment arms 48 are located in pairs extending outwardly from opposed sides of the central portion 42 and spaced axially therealong. The attachment arms 48 are generally rectangular in shape. The lower attachment arms 48 have an accordion portion 50 at a free end thereof. The accordion portion 50 expands as the connecting portion 25 of the air bag 22 expands. The accordion portion 50 has an aperture 52 for a trim attachment (not shown) extending therethrough. The trim attachment is also attached to a trim molding 56 to be described. The upper attachment arms 48 have a return edge 54 with an aperture 55 extending therethrough for attachment by a trim fastener 59 to be described to a trim molding 56 to be described. The inflator bracket 42 may be made of a metal or plastic material. It should be appreciated that the accordion portion 50 may be attached to the trim molding 56 by other suitable means such as an adhesive or sonic welding. It should also be appreciated that the spacing, width and number of attachment arms 48 are adjustable for packaging and attachment needs.

The head air bag system 10 also includes a trim molding 56 attached to the inflator bracket 42 for covering the C-pillar 20. The trim molding 56 houses the inflator 30, inflator bracket 42, and air bag 22. The trim molding 56 is made of a plastic material and extends laterally and longitudinally. The trim molding 56 has a pair of side walls 57 extending outwardly and a base wall 58 interconnecting the side walls 57 to form a generally squared-off pyramid shape. The trim molding 56 is attached by suitable means such as fasteners 59 extending through an aperture (not shown) in the base wall 58 and the apertures 55 in the return edge 54 of the attachment arms 48. It should be appreciated that the fasteners 59 may be similar to the trim attachment for the accordion portion 50. It should also be appreciated that the return edge 54 may be attached to the trim molding 56 by other suitable means such as an adhesive or sonic welding.

The head air bag system 10 includes a rear door seal 60 at one end of the C-pillar 20 for cooperating with a rear door (not shown) of the automotive vehicle 12. The rear door seal 60 is made of an elastomeric material and has a pair of opposed flanges 62 forming a slot 64 for receiving an end of the C-pillar 20. The rear door seal 60 also includes a retaining lip 66 extending outwardly to overlap an edge of the trim molding 56.

In operation, the head air bag system 10 is mounted to the C-pillar 20 and the air bag 22 is in a folded stowed position between the inflator bracket 42 and the trim molding 56. When the automotive vehicle experiences a collision-indicating condition of at least a predetermined threshold level, the inflator 30 is activated and a gas is expelled through the adapter 34 and into the air bag 22. Gas enters the air bag 22 and the connecting portion 25 is inflated behind the C-pillar 20 to move the trim molding 56 inboard to disengage the rear door seal 60 as illustrated in FIG. 3. The air bag 22 extends through an opening between the trim molding 56 and C-pillar 20. The return edge 54 facilitates the movement of the trim molding 56, which extends and stays extended, but remains attached to the inboard attachment arms 48. The air bag 22 deploys inboard into the occupant compartment 16 of the automotive vehicle 12 between the occupant and the vehicle side as illustrated in FIG. 1. The trim molding 56 and inflator bracket 42 act as a head absorption for occupants. Upon head impact, the accordion portions 50 crush and provide energy absorption. It should be appreciated that a rear occupant's head (not shown), especially for a $95^{th}$ percentile occupant is right next to the trim molding 56.

Figure 4:
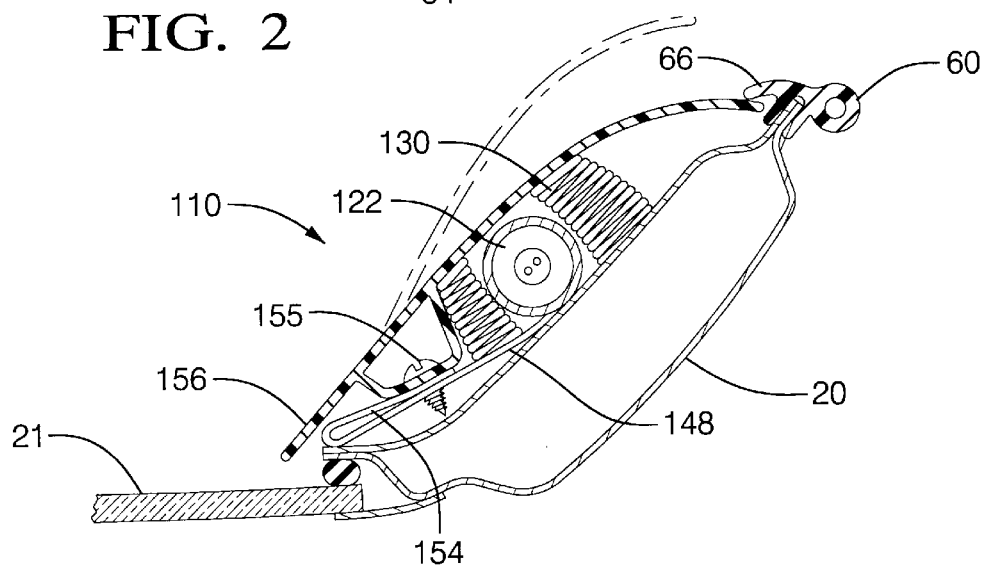
FIG. 4 is a view similar to FIG. 2 of another embodiment, according to the present invention, of the head air bag system of FIG. 1.

Referring to FIG. 4, another embodiment 110, according to the present invention, of the head air bag system 10 is shown. Like parts to the head air bag system 10 has like reference numerals increased by one hundred (100). The head air bag system 110 eliminates the outboard attachment arms 48 with the accordion portions 50. The operation of the head air bag system 110 is similar to the head air bag system 10 except for the operation of the accordion portions 50.

Figure 5:
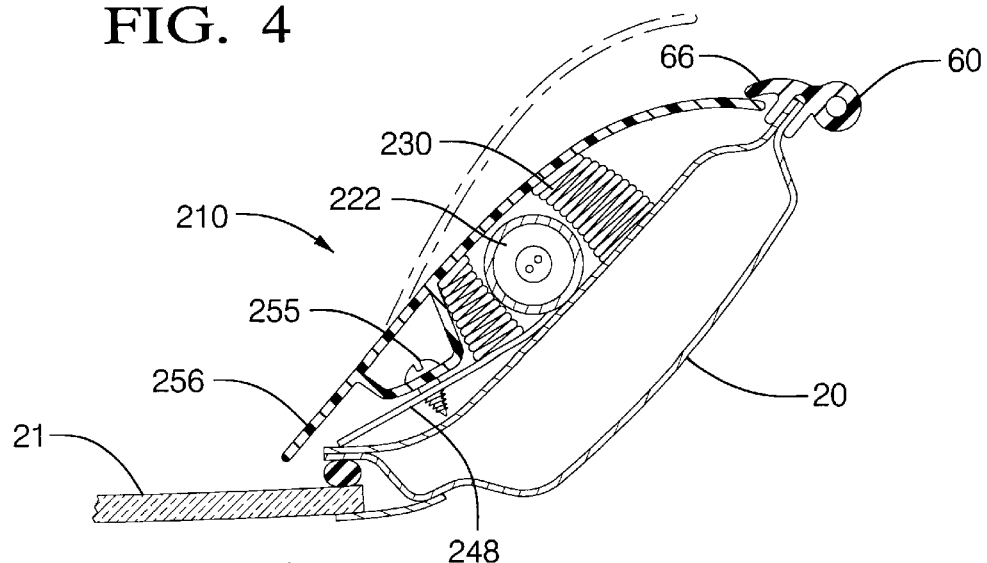
FIG. 5 is a view similar to FIG. 2 of yet another embodiment, according to the present invention, of the head air bag system of FIG. 1.

Referring to FIG. 5, yet another embodiment 210, according to the present invention, of the head air bag system 10 is shown. Like parts to the head air bag system 10 has like reference numerals increased by two hundred (200). The head air bag system 210 eliminates the outboard attachment arms 48 with the accordion portions 50 and the return edge 54. The operation of the head air bag system 110 is similar to the head air bag system 10 except for the operation of the accordion portions 50 and return edge 54. It should be appreciated that the head air bag system 110 and 210 may include a tether (not shown) attached to the trim molding 56 to control movement of the trim molding 56 during inflation of the air bag.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A head air bag system for an automotive vehicle comprising:
    a bracket mounted to a C-pillar of an automotive vehicle;
    an inflator mounted to said bracket;
    an air bag operatively connected to said inflator; and
    a trim molding attached to said bracket for covering the C-pillar and housing said inflator, bracket and said air bag, wherein said air bag is inflated by said inflator adjacent a head of a rear occupant seated in the automotive vehicle.

2. A head air bag system as set forth in claim 1 wherein said air bag comprises a first panel and a second panel and being connected together.

3. A head air bag system as set forth in claim 1 including a fastener for securing a portion of said trim molding to said bracket.

4. A head air bag system as set forth in claim 3 including a seal attached to the C-pillar and having a lip overlapping an edge of said trim molding.

5. A head air bag system as set forth in claim 2 wherein said bracket extends longitudinally and has at least one pair of opposed attachment arms extending transversely.

6. A head air bag system as set forth in claim 2 including a clamp to clamp on open end of said air bag to said inflator.

7. A head air bag system as set forth in claim 1 wherein said inflator is generally cylindrical in shape.

8. A head air bag system as set forth in claim 7 wherein said inflator includes a radial to axial flow adapter to direct the flow of inflation axially into said air bag.

9. A head air bag system for an automotive vehicle comprising:

a bracket mounted to a C-pillar of an automotive vehicle;

an inflator mounted to said bracket;

an air bag operatively connected to said inflator;

a trim molding housing said inflator, bracket and said air bag, wherein said air bag is inflated by said inflator adjacent a head of a rear occupant seated in the automotive vehicle;

said bracket extending longitudinally and having at least one pair of opposed attachment arms extending transversely; and wherein said bracket includes a tension strap attachment extending transversely.

10. A head air bag system for an automotive vehicle comprising:

a bracket mounted to a C-pillar of an automotive vehicle;

an inflator mounted to said bracket;

an air bag operatively connected to said inflator;

a trim molding housing said inflator, bracket and said air bag, wherein said air bag is inflated by said inflator adjacent a head of a rear occupant seated in the automotive vehicle;

said bracket extending longitudinally and having at least one pair of opposed attachment arms extending transversely; and wherein said each of said attachment arms has either one of a return edge and accordion portion at an end thereof.

11. A head air bag system as set forth in claim 10 wherein said bracket includes at least one mounting stud adapted to extend through the C-pillar.

12. A head air bag system for an automotive vehicle comprising:

a bracket mounted to a C-pillar of an automotive vehicle;

an inflator mounted to said bracket;

an air bag operatively connected to said inflator;

a trim molding attached to said bracket for covering the C-pillar and housing said inflator, bracket and said air bag; and at least one fastener for securing a portion of said trim molding to said bracket, wherein said air bag is inflated by said inflator adjacent a head of a rear occupant seated in the automotive vehicle.

13. A head air bag system as set forth in claim 12 including a seal attached to the C-pillar and having a lip overlapping an edge of said trim molding.

14. A head air bag system as set forth in claim 13 wherein said bracket extends longitudinally and has at least one pair of opposed attachment arms extending transversely.

15. A head air bag system for an automotive vehicle comprising:

a bracket mounted to a C-pillar of an automotive vehicle;

an inflator mounted to said bracket;

an air bag operatively connected to said inflator;

a trim molding housing said inflator, bracket and said air bag; and at least one fastener for securing a portion of said trim molding to said bracket, wherein said air bag is inflated by said inflator adjacent a head of a rear occupant seated in the automotive vehicle; and wherein said each of said attachment arms has either one of a return edge and accordion portion at an end thereof.

16. A head air bag system as set forth in claim 15 wherein said inflator extends axially and is generally cylindrical in shape.

17. A head air bag system as set forth in claim 16 wherein said inflator includes a radial to axial flow adapter to direct the flow of inflation axially into said air bag.

18. A head air bag system as set forth in claim 17 including a clamp to clamp on open end of said air bag to said inflator.

19. A head air bag system as set forth in claim 18 wherein said bracket includes at least one mounting stud adapted to extend through the C-pillar.

20. A head air bag system for an automotive vehicle comprising:

a bracket mounted to a C-pillar of an automotive vehicle;

an inflator mounted to said bracket;

an air bag operatively connected to said inflator;

a trim molding attached to said bracket for covering the C-pillar and housing said inflator, bracket and said air bag;

at least one fastener for securing an inboard portion of said trim molding to said bracket; and a seal attached to the C-pillar and having a lip overlapping an outboard edge of said trim molding, wherein said air bag is inflated by said inflator adjacent a head of a rear occupant seated in the automotive vehicle.

* * * * *